US007879927B2

(12) United States Patent
Vlottes et al.

(10) Patent No.: US 7,879,927 B2

(45) Date of Patent: Feb. 1, 2011

(54) MOULDED OBJECT EXHIBITING A POLYCHROMATIC EFFECT, ASSOCIATED LIGHT DEVICE AND RESIN

(75) Inventors: Peter Vlottes, La Harlingen (NL); Wim Slouwerhof, Jd Leeuwarden (NL); Amy A. Lefebvre, Pottstown, PA (US); Robert A. Wanat, Langhorne, PA (US)

(73) Assignee: Arkema France, Colombes (FR)

( * ) Notice: Subject to any disclaimer, the term of this patent is extended or adjusted under 35 U.S.C. 154(b) by 537 days.

(21) Appl. No.: 11/815,040

(22) PCT Filed: Feb. 14, 2006

(86) PCT No.: PCT/EP2006/002067

§ 371 (c)(1),
(2), (4) Date: Jul. 30, 2007

(87) PCT Pub. No.: WO2006/087241

PCT Pub. Date: Aug. 24, 2006

(65) Prior Publication Data

US 2008/0214706 A1 Sep. 4, 2008

Related U.S. Application Data

(60) Provisional application No. 60/668,673, filed on Apr. 6, 2005, provisional application No. 60/754,886, filed on Dec. 29, 2005.

(30) Foreign Application Priority Data

Feb. 17, 2005 (FR) .................................. 05 01622

(51) Int. Cl.

| | |
|---|---|
| ***C08K 5/03*** | (2006.01) |
| ***C08K 5/3412*** | (2006.01) |
| ***C08K 5/3432*** | (2006.01) |
| ***C08K 5/3467*** | (2006.01) |
| ***C08K 5/353*** | (2006.01) |
| ***C08K 5/357*** | (2006.01) |
| ***C08K 5/15*** | (2006.01) |

(52) U.S. Cl. ............................ 524/83; 524/90; 524/95; 524/99; 524/100; 524/110; 524/474; 524/56

(58) Field of Classification Search .................. 524/90, 524/556, 83, 95, 99, 100, 110, 474

See application file for complete search history.

(56) References Cited

U.S. PATENT DOCUMENTS

| | | | |
|---|---|---|---|
| 6,584,714 | B1 * | 7/2003 | Wehrmann et al. ............ 40/546 |
| 2003/0189838 | A1 | 10/2003 | Schottland et al. |
| 2004/0063821 | A1 | 4/2004 | Gorny et al. |
| 2004/0191492 | A1 | 9/2004 | Reilly et al. |
| 2005/0288416 | A1 | 12/2005 | Lichtenstein et al. |

FOREIGN PATENT DOCUMENTS

| | | |
|---|---|---|
| JP | 59166551 | 9/1984 |

* cited by examiner

*Primary Examiner*—Kriellion A Sanders

(74) *Attorney, Agent, or Firm*—Thomas F. Roland

(57) ABSTRACT

The present invention relates to a moulded object made of a transparent and colored plastic exhibiting a polychromatic effect, characterized in that the transparent plastic comprises from 0.1 to 1500 ppm of at least one fluorescent dye and from 50 to 10 000 ppm of at least one optical brightener. It also relates to the resin used for forming the moulded object. It also relates to a light device combining the said moulded object with at least one artificial light source which exhibits an emission in the region of excitation of the optical brightener, in particular in the 300-450 nm range, preferably 350-420 nm range, more preferably still 350-400 nm range.

23 Claims, 2 Drawing Sheets

Figure 2:
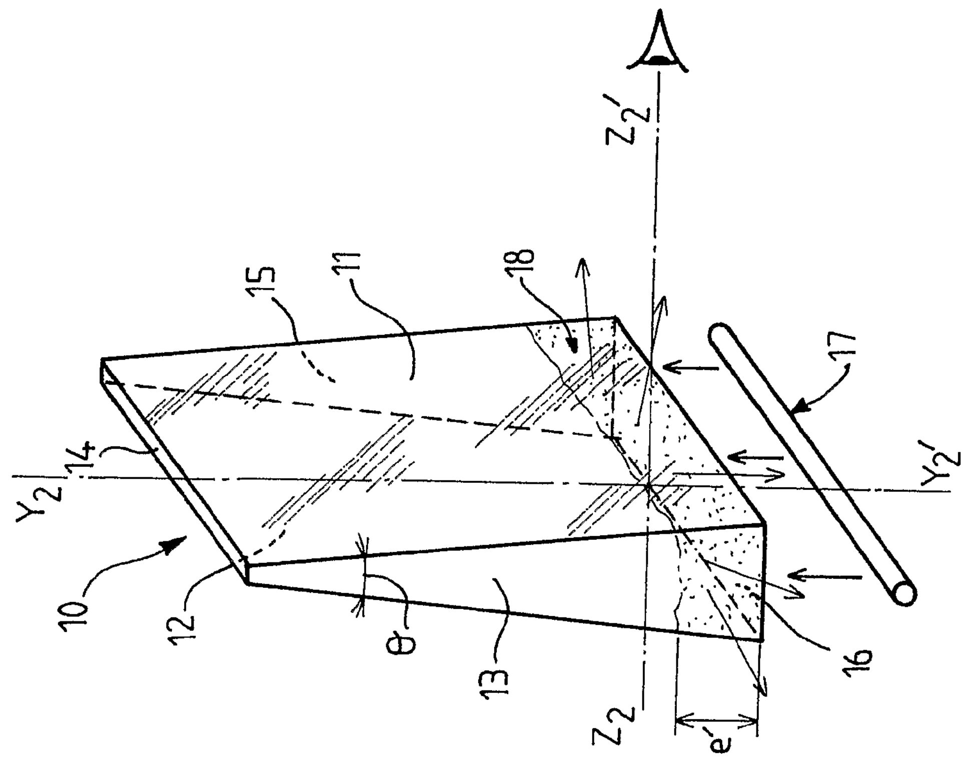

MOULDED OBJECT EXHIBITING A POLYCHROMATIC EFFECT, ASSOCIATED LIGHT DEVICE AND RESIN

CROSS REFERENCE TO RELATED APPLICATION

This application claims the benefit of French Application FR 05.01622 and U.S. Provisional Applications No. 60/668,673 and No. 60/754,886, which applications are incorporated herein by reference.

This application claims benefit, under U.S.C. §119 or §365 of PCT application PCT/EP2006/002067, filed Feb. 14, 2006; French Application Number FR 05.01622, filed Feb. 17, 2005; and US Provisional Applications US 60/668,673, filed Apr. 6, 2005, and US 60/754,886, filed Dec. 29, 2005.

The present invention relates to a moulded object made of a transparent and coloured plastic exhibiting a polychromatic effect. It relates more particularly to objects made of PMMA or of polycarbonate, moulded from the sheet form, injection moulded, or extruded, and also to resin from which the moulded objects are formed.

Poly(methyl methacrylate) (PMMA) or polycarbonate (PC) are two plastics valued for their excellent optical properties (in particular their gloss and their high transparency with a transmission of at least 90% of visible light). They are used in numerous applications of every day life where a visual effect is desired, for example in the manufacture of decorative objects (displays in ready-to-wear shops, lights, panels for kitchens, and the like), for hoardings, and the like.

Objects which exhibit attractive visual effects are increasingly desired as they are a means of capturing the attention of consumers, customers or users or very simply of enlivening daily life. In this field, fluorescent colours are particularly desired as they set off the objects in a more visible way than nonfluorescent colours.

The present invention relates to a moulded object made of a transparent and coloured plastic exhibiting a polychromatic effect. It also relates to a light device in which the said moulded object is combined with at least one artificial light source which exhibits an emission in the region of excitation of the optical brightener, in particular in the 300-450 nm range, preferably 350-420 nm range, more preferably still 350-400 nm range. It also relates to the resin from which the moulded object is formed

PRIOR ART

Application EP 1 464 517 discloses a structure exhibiting a polychromatic visual effect obtained by the superimposition of at least two transparent layers of different colours. The effect is characterized by a different perception of the colour depending on the angle along which the structure is observed (polychromatic angular effect). The structure is obtained by joining together at least two transparent layers by coextrusion. It is necessary to have available two extrusion dies and to suitably join together the two layers, that is to say without producing defects at the interface between the two layers.

Patent EP 0 794 975 B1 discloses a polycarbonate composition exhibiting a fluorescent colour which is maintained over time. The composition can also comprise less than 0.01% (100 ppm) of an optical brightener, the role of which is to neutralize the possible yellowing of the sheet.

Patent EP 0 402 458 B1 discloses a visual display device which reemits light via the edge. The device is manufactured from PMMA or polycarbonate comprising a fluorescent dye.

Application EP 0 559 083 discloses a moulded object made of plastic, in particular of PMMA, comprising a fluorescent dye and a dispersion of $BaSO_4$.

Application WO 99/16847 discloses a mixture of fluorescent dyes which can be used in transparent materials, such as, in particular, PC or PMMA.

Application WO 2004/033543 discloses a structure exhibiting a visual effect based on a transparent material (for example made of PMMA or of polycarbonate) comprising a soluble fluorescent compound, a scattering filler, such as $BaSO_4$, and a white pigment (for example, $TiO_2$, ZnO or ZnS) being dispersed in the material. The white pigment makes it possible to improve the colour brilliance.

Application WO 03/086813 discloses a polycarbonate comprising a fluorescent dye that may optionally be blended with a non-fluorescent dye.

Application US 2004/0063821 discloses a polycarbonate comprising new types of optical brighteners.

None of these documents refers to a transparent plastic comprising from 0.1 to 1500 ppm of at least one fluorescent dye and from 50 to 10 000 ppm of at least one optical brightener which makes it possible to obtain a polychromatic effect.

BRIEF DESCRIPTION OF THE INVENTION

The present invention relates to a moulded object made of coloured, transparent plastic exhibiting a polychromatic effect, characterized in that the transparent plastic comprises from 0.1 to 1500 ppm of at least one fluorescent dye and from 50 to 10 000 ppm of at least one optical brightener.

The moulded object is preferably provided in the sheet form. The transparent plastic is preferably PMMA or polycarbonate.

Another subject-matter of the invention relates to a light device comprising a moulded object made of a transparent and coloured plastic comprising from 0.1 to 1500 ppm of at least one fluorescent dye and from 50 to 10 000 ppm of at least one optical brightener and at least one artificial light source which exhibits an emission in the region of excitation of the optical brightener, in particular in the 300-450 nm range, preferably 350-420 nm range, more preferably still 350-400 nm range.

An additional subject matter of the invention relates to the resin used in forming the moulded objects having from 0.1 to 1500 ppm of at least one fluorescent dye and from 50 to 10 000 ppm of at least one optical brightener The invention may be better understood on reading the detailed description which will follow and the non-limiting exemplary embodiments thereof and on examining the appended figures.

DETAILED DESCRIPTION

The term "transparent plastic material" denotes a plastic material of thermoplastic or thermosetting nature exhibiting a light transmission in the visible region of at least 50%, preferably of at least 70% and more preferably still of at least 80%, according to Standard DIN 67-507. By way of example, it can be crystal polystyrene, poly(ethylene terephthalate), a transparent polyolefin, in particular a clarified polyolefin, for example clarified polypropylene, PMMA, transparent polyamide or polycarbonate. PMMA and polycarbonate are two transparent plastics of choice because of their ease of processing, their availability on the market and their high transparency. The polychromatic effect is thus particularly visible with PMMA or polycarbonate.

The term "PMMA" denotes a methyl methacrylate (MMA) homopolymer or a copolymer comprising from 60 to 100% by weight of methyl methacrylate and from 0 to 40% by weight of at least one monomer having at least one ethylenic unsaturation which can copolymerize with methyl methacrylate. These monomers are well known and mention may be made, in particular, of acrylic acid, methacrylic acid and the alkyl (meth)acrylates in which the alkyl group has from 2 to 4 carbon atoms. Mention may be made, as examples, of methyl acrylate, ethyl acrylate or butyl acrylate. It is preferably a methyl methacrylate homopolymer or a copolymer comprising, by weight, from 80 to 99.7%, preferably of 90 to 99.5%, of methyl methacrylate and from 0.3 to 10%, preferably from 0.5 to 10%, of at least one monomer having at least one ethylene unsaturation which can copolymerize with methyl methacrylate.

The term "polycarbonate (PC)" denotes a polyester of carbonic acid, that is to say a polymer obtained by the reaction of at least one carbonic acid derivative with at least one aromatic or aliphatic diol. The preferred aromatic diol is bisphenol A, which reacts with phosgene or else, by transesterification, with ethyl carbonate.

It can be homopolycarbonate or copolycarbonate based on a bisphenol of formula HO-Z-OH for which Z denotes a divalent organic radical which has from 6 to 30 carbon atoms and which comprises one or more aromatic group(s). As examples, the diphenol can be:

dihydroxybiphenyls,
bis(hydroxyphenyl)alkanes,
bis(hydroxyphenyl)cycloalkanes,
indanebisphenols,
bis(hydroxyphenyl)ethers,
bis(hydroxyphenyl)ketones,
bis(hydroxyphenyl)sulphones,
bis(hydroxyphenyl)sulphoxides,
α,α'-bis(hydroxyphenyl)diisopropylbenzenes.

It can also relate to derivatives of these compounds obtained by alkylation or halogenation of the aromatic ring. Mention will more particularly be made, among the compounds of formula HO-Z-OH, of the following compounds:

hydroquinone,
resorcinol,
4,4'-dihydroxybiphenyl,
bis(4-hydroxyphenyl)sulphone,
bis(3,5-dimethyl-4-hydroxyphenyl)methane,
bis(3,5-dimethyl-4-hydroxyphenyl)sulphone,
1,1-bis(3,5-dimethyl-4-hydroxyphenyl)-para/meta-isopropylbenzene,
1,1-bis(4-hydroxyphenyl)-1-phenylethane,
1,1-bis(3,5-dimethyl-4-hydroxyphenyl)cyclohexane,
1,1-bis(4-hydroxyphenyl)-3-methylcyclohexane,
1,1-bis(4-hydroxyphenyl)-3,3-dimethylcyclohexane,
1,1-bis(4-hydroxyphenyl)-4-methylcyclohexane,
1,1-bis(4-hydroxyphenyl)cyclohexane,
1,1-bis(4-hydroxyphenyl)-3,3,5-trimethylcyclohexane,
2,2-bis(3,5-dichloro-4-hydroxyphenyl)propane,
2,2-bis(3-methyl-4-hydroxyphenyl)propane,
2,2-bis(3,5-dimethyl-4-hydroxyphenyl)propane,
2,2-bis(4-hydroxyphenyl)propane (or bisphenol A),
2,2-bis(3-chloro-4-hydroxyphenyl)propane,
2,2-bis(3,5-dibromo-4-hydroxyphenyl)propane,
2,4-bis(4-hydroxyphenyl)-2-methylbutane,
2,4-bis(3,5-dimethyl-4-hydroxyphenyl)-2-methylbutane,
α,α'-bis(4-hydroxyphenyl)-o-diisopropylbenzene,
α,α'-bis(4-hydroxyphenyl)-m-diisopropylbenzene (or bisphenol M).

The preferred polycarbonates are the homopolycarbonates based on bisphenol A or 1,1-bis(4-hydroxyphenyl)-3,3,5-trimethylcyclohexane and the copolycarbonates based on bisphenol A and 1,1-bis(4-hydroxyphenyl)-3,3,5-trimethylcyclohexane.

The polycarbonates are produced by reaction of bisphenol(s) with phosgene in a homogeneous or interfacial process or of bisphenol(s) with a carbonate by transesterification. For further details, reference may be made to Schnell, "Chemistry and Physics of Polycarbonates", Interscience Publishers, 1964, or alternatively to "Polycarbonates" in Encyclopedia of Polymer Science and Engineering, Volume 11, 2nd edition, 1988, pages 648-718, and in U. Grigo, K. Kircher and P. R. Müller, "Polycarbonate", in the work Becker, Braun, Kunststoff-Handbuch, Volume 3/1, Polycarbonate, Polyacetale, Polyester, Cellulose-ester, Carl Hanser Verlag Munich, Vienna 1992, pages 117 to 299.

Fluorescent Dye

The moulded object comprises at least one fluorescent dye. The term "fluorescent dye" denotes an organic molecule which has the characteristic of absorbing light and of reemitting it from the first excited state S1 to a base state S0 (for further details with regard to fluorescence, see Uliman's Encyclopaedia of Industrial Chemistry, 5th edition, Volume A11, pages 279-291). The fluorescent dye absorbs and reemits in the visible light region.

The fluorescent dye can be chosen, for example, from the family:

of the perylenes, in particular those of formula (I):

(I)

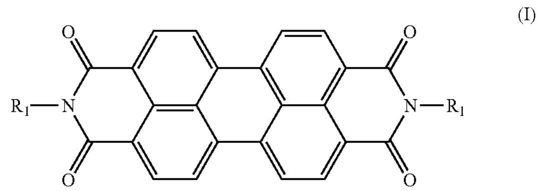

in which $R_1$ denotes:

- an alkyl group having from 1 to 20 carbon atoms,
- a cycloalkyl group having from 3 to 20 carbon atoms,
- an alkyl group having from 1 to 20 carbon atoms which is substituted by one or more groups of —OH, —$OR_2$, —C(═O)—$OR_2$, —C(═O)—$NR_2R_3$, —$NR_2$—C(═O)$R_3$, phenyl or substituted phenyl type with $R_2$ and $R_3$ denoting —H or an alkyl group having from 1 to 20 carbon atoms.

$R_1$ denotes in particular the following groups: N,N'-bis(2-hydroxyethyl), N,N'-bis(n-pentyl), N,N'-bis(n-dodecyl), N,N'-bis(2-ethylphenyl) and N,N'-bis(2,4,6-trimethylphenyl).

- of the coumarins, in particular those having the following CAS Nos.: [27425-55-4], [12221-86-2], [38215-36-0], [34564-13-1], [62143-26-4], [28754-28-1] and [55470-53-6];
- of the xanthenes, in particular those having the following CAS Nos.: [518-47-8] (fluorescein, CI-45350, acid yellow 73), [18472-87-2] (phloxine B, CI-45410), [632-68-8] (rose bengal, CI-45440), [81-88-9] (rhodamine B), [2390-63-8] (rhodamine 3B, CI-45175), [52372-39-1] and [52372-36-8];
- of the thioxanthenes, in particular those having the following CAS Nos.: [16294-75-0], [14121-47-2] and [18014-08-9];

of the azlactones, in particular those having the following CAS Nos.: [25774-09-6] and [51202-86-9];

of the methines, in particular those having the following CAS Nos.: [23406-34-0] and [84-33-3];

of the oxazines and thiazines, in particular the product having the following CAS No.: [63589-47-9].

Mention will also be made, as fluorescent dyes, of those with the LUMOGEN trade mark sold by BASF, in particular LUMOGEN F Orange 240 (an orange perylene derivative), LUMOGEN F Yellow 083 (a yellow perylene derivative), LUMOGEN F Red 240 or LUMOGEN F Red 300 (a red perylene derivative), LUMOGEN Violet F-570 (a violet naphtalimide derivative). It can also relate to MACROLEX Yellow 10 GN (a courmarine dyestuff) or MACROLEX Red G, (a anthraquinone dyestuff), LISA 57Y, LISA 50B, LISA 51 GB or LISA 61R from Bayer, HOSTASOL Yellow 3G (CAS# 12671-74-8) from Clariant, and Solvent Yellow 191 from Lancer. The fluorescent dyes with the trademarks just mentioned are generally sold in the masterbatch form, that is to say as a dispersion in a polymer.

Fluorescent dyes, which are organic molecules, are sometimes preferred to fluorescent pigments due to their ease in dispersing in the plastic. Another advantage lies in the fact that, for the process of producing cast sheets, the fluorescent dye in the form of an organic molecule is soluble in methyl methacrylate or the mixture of monomers comprising methyl methacrylate, whereas there may be problems of dispersion and/or sedimentation in the case of pigments.

The fluorescent dye is present in the transparent plastic at a concentration of between 0.1 and 1500 ppm, rather between 0.1 and 1000 ppm, advantageously between 0.1 and 500 ppm, preferably between 0.5 and 100 ppm, more preferably still between 0.5 and 10 ppm, and most preferably between 2 and 10 ppm with respect to the transparent plastic (ppm: by weight).

Other Dye

It is also possible for the plastic to comprise, in addition to the fluorescent dye(s), one or more other nonfluorescent dyes in order to obtain a novel hue. Other nonfluorescent dyes are pigments or soluble organic dyes. Mention may be made, as examples, of copper phthalocyanine green, copper phthalocyanine blue, red iron oxide, ultramarine blue, chrome titanium yellow or dyes of the anthraquinone type. The combination of a fluorescent dye with a nonfluorescent dye makes it possible to cover a more extensive spectrum of colours. For example, the combination of a fluorescent dye possessing yellow fluorescence with a green pigment, for example copper phthalocyanine green, can be judiciously used to produce a fluorescent brilliant green. The other dye can also optionally be carbon black.

The concentration of the nonfluorescent dye(s) in the transparent plastic is between 0 and 3000 ppm, rather between 0 and 2000 ppm, advantageously between 0 and 1000 ppm, preferably between 0 and 700 ppm, more preferably still between 0 and 500 ppm, with respect to the transparent plastic (ppm by weight).

Optical Brightener

An optical brightener is a colourless or weakly coloured organic compound which absorbs in the ultraviolet region in the 300-430 nm range and reemits the absorbed light energy in the visible region in the 400-500 mm range (for further details with regard to optical brighteners see Ullman's Encyclopaedia of Industrial Chemistry, 5th edition, Volume A18, pages 153-176). This type of compound is already well known in plastics in order to compensate for the problem of yellowing of the plastic. In this application, it is added at a concentration of the order of a few ppb, that is to say at a lower concentration than for the present invention. The activity of a particular optical brightener depends on the polymer in which it is used as is mentioned in US 2004/0063821 A1. In the context of the present invention, it has been found, surprisingly, that the combination of an optical brightener at a concentration of greater than 50 ppm, preferably 100 ppm, more preferably 150 ppm and most preferably 200 ppm and of a fluorescent dye with respect to the transparent plastic makes it possible to create an advantageous and surprising polychromatic effect (ppm by weight). The concentration may be up to 10 000 ppm by weight with respect to the transparent plastic.

The optical brightener can be chosen from the family of the:

distyrylbenzenes, in particular those having the following CAS Nos.: [13001-39-3], [79026-03-2], [13001-38-2], [36775-00-7], [79026-02-1] and [13001-40-6];

distyrylbiphenyls, in particular those having the following CAS Nos.: [27344-41-8], [51119-63-2], [42380-62-1], [60477-28-3] and [40470-68-6];

divinylstilbenes, in particular those having the following CAS Nos.: [60683-03-6] and [60682-87-3];

coumarins, in particular those having the following CAS Nos.: [91-44-1], [6025-18-9], [19683-09-1], [3333-62-8], [63660-99-1], [26867-94-7] and [52725-14-1];

triazinylaminostilbenes, in particular those having the following CAS Nos.: [3426-43-5], [35632-99-6], [24565-13-7], [12224-16-7], [13863-31-5], [4193-55-9], [16090-02-1], [133-66-4], [68444-86-0], [61968-74-9], [12224-02-1], [99549-42-5], [16470-24-9], [74228-28-7], [83512-97-4] and [76482-78-5];

stilbenzylbenzoxazoles, in particular those having the following CAS Nos.: [18039-18-4] and [64893-28-3];

bis(benzoxazoles), in particular those having the following CAS Nos.: [1041-00-5], [2866-43-5], [7128-64-5], [5089-22-5], [1552-46-1], [1533-45-5] and [5242-49-9];

benzimidazoles, in particular those having the following CAS Nos.: [72829-17-5], [74878-56-1], [74878-48-1] and [66371-25-3];

pyrazolines (1,3-diphenyl-2-pyrazolines), in particular those having the following CAS Nos.: [2744-49-2], [60650-43-3], [3656-22-2], [27441-70-9], [32020-25-0], [61931-42-8], [106359-93-7], [85154-08-1], [42952-22-7], [63310-12-3], [12270-54-1], [36086-26-7] and [81209-71-4].

Preference will be given, among the optical brighteners mentioned above, to coumarins, bis(benzoxazoles) and pyrazolines. The pyrazolines, especially the 1,3-diphenyl-2-pyrazoline types) give the best effect, especially in the case of PMMA.

The optical brightener is present in the transparent plastic at a concentration of between 50 and 10 000 ppm, preferably between 100 and 10 000 ppm, rather between 150 and 5000 ppm, preferably between 150 and 1000 ppm, more preferably still between 200 and 1000 ppm, most preferably between 200 and 800 ppm (ppm by weight) with respect to the transparent plastic.

Other Additives

The transparent plastic can comprise other additives in addition to the fluorescent dye(s) and the brightener(s). The other additives can in particular be inorganic or organic particles, the size of which is between 0.1 and 1000 μm, preferably between 0.1 and 200 μm, more preferably still between 1 and 5 μm, which exhibit a difference in refractive index, with respect to the transparent plastic, of ±0.003 to 0.2 (according to ASTM D-542). The concentration of these particles is between 0.001 and 0.1% by weight with respect to the transparent plastic. Polymer particles that are refractive index match and serve as impact modifiers having a particle size in the range of 0.05-0.4 μm may also be added up to 50 weight percent based on the total amount of thermoplastic or thermosetting polymer. Acrylic polymer beads, having a composition of cross-linked polymethyl methacrylate homopolymer or copolymer with acrylic monomers, may also be present at up to 50 weight percent based on the total amount of thermoplastic or thermosetting polymer. The cross-linked beads may be either refractive index matched or mismatched, and may be up to 50 μm in size. The other additives can, for example, be particles of barium sulphate, of polyamide, in particular of Orgasol, of polytetrafluoroethylene, of calcium carbonate, of magnesium silicate, of polystyrene, of titanium dioxide, of beads of crosslinked plastic, of kaolin or of mica. The particles of mica can be in particular those sold by Merck under the Iriodin trade mark, in particular Iriodin® 153, Iriodin® 163, Iriodin® 103 or Iriodin® 215.

The inorganic or organic particles can be homogeneously dispersed in the transparent plastic. It is also possible for them to be heterogeneously dispersed in the transparent plastic. Thus, for example in the case of a cast sheet, the particles can be accumulated on one of the two faces of the sheet. This accumulation is obtained by the sedimentation of the particles in the liquid mixture which has to be polymerized, as is taught in the documents JP 10219183, JP 10182918 and JP 11013987 from Sumitomo Chemical.

However, the presence of particles in the transparent plastic has a tendency to somewhat affect the transparency. Preference will therefore be given, for applications for which transparency is important, to a plastic devoid of inorganic or organic particles. However, as described above, particles or beads that are refractive index matched can retain the transparency.

About the Resin

The invention further relates to the transparent plastic comprising from 0.1 to 1500 ppm of at least one fluorescent dye and from 50 to 10 000 ppm of at least one optical brightener (ppm by weight). The invention thus relates to a resin comprising:

a) a transparent plastic exhibiting a light transmission in the visible region of at least 50%, preferably of at least 70% and more preferably of at least 80, according to Standard DIN 67-507;
b) from 0.1 to 1500 ppm, rather from 0.1 to 1000 ppm, advantageously from 0.1 to 500 ppm, preferably from 0.5 to 100 ppm, more preferably still from 0.5 to 10 ppm, and most preferably from 2 to 10 ppm with respect to the transparent plastic (ppm: by weight) of at least one fluorescent dye; and
c) from 50 to 10 000 ppm, preferably from 100 to 10 000 ppm, rather from 150 to 5000 ppm, preferably from 150 to 1000 ppm, more preferably still from 200 to 1000 ppm, most preferably from 200 to 800 ppm (ppm by weight) with respect to the transparent plastic of at least one optical brightener.

The transparent plastic is preferably a polystyrene, poly (ethylene terephthalate), a transparent polyolefin, PMMA, a transparent polyamide or polycarbonate Process for Producing the Moulded Object A moulded object can be formed from the resin by any mean known in the art. The term "moulded object" is understood to mean an object which has been formed using techniques for the conversion of plastics known to a person skilled in the art, such as, for example, injection moulding, extrusion or pressing. These techniques use granules or beads of the resin plastic which are first of all melted and then put into the desired form. The moulded object can have, for example, the form of a pipe, of a rod, of a cube, of a sheet, and the like. The various additives which the transparent plastic comprises (fluorescent dye(s), optional nonfluorescent dye(s), optical brightener(s), optional inorganic or organic particles, and the like) are introduced into the cycle for the manufacture of transparent plastic either upstream of the cycle, that is to say introduced into the mixture which polymerizes, or downstream of the cycle, that is to say into the transparent plastic in the molten state.

Preferably, the moulded object has the form of a sheet, preferably in the form of a monolayer sheet (comprising both the optical brightener and the fluorescent dye and optionally the other ingredients described above). It is preferably a PMMA or a PC sheet. The thickness of the sheet is between 1 and 300 mm, advantageously between 1 and 100 mm, preferably between 1 and 50 mm, more preferably still between 2 and 40 mm.

There are several processes known to a person skilled in the art for producing a PMMA or PC sheet or other shapes. The process by extrusion consists in introducing granules or beads of the transparent plastic into an extruder and, at the outlet of the extruder, in configuring the molten material into the form of a sheet or other shape. The various additives which the transparent plastic comprises (fluorescent dye(s), optional nonfluorescent dye(s), optical brightener(s), optional inorganic or organic particles, and the like) can be introduced into the extruder or else can be already present in the granules or beads.

With regard to the casting process, it consists in using a mould formed of two flat sheets, for example made of inorganic glass, separated by a peripheral seal (referred to as hank), generally made of poly(vinyl chloride), which provides leaktightness between the two sheets. The mould is closed by clamps placed over the sides. The composition to be polymerized or the monomer(s) or a syrup formed of prepolymer (that is to say, the monomer(s) which has/have partially polymerized, so as to achieve a degree of conversion of the order of 5-10%), to which a polymerization initiator has been added in an amount sufficient to polymerize the methyl methacrylate or to complete the polymerization of the syrup, according to circumstances, is poured into the mould. The composition to be polymerized also comprises various additives: fluorescent dye(s), optional nonfluorescent dye(s), optical brightener(s), optional inorganic or organic particles and optionally other conventional additives, such as a crosslinking agent, a mould-release agent, a chain-transfer agent for controlling the average molar mass of the final polymer, an antioxidant, and the like. The polymerization is carried out or completed, according to circumstances, by placing the mould in water ("bath" process) or in an oven at the necessary temperature (40-80° C.) and then in an oven (at 100-130° C. approximately) for the postpolymerization. The thickness of the hank determines the thickness of the polymer sheet obtained.

By virtue of all the processes for producing the moulded object which have just been described, the fluorescent dye, the optional nonfluorescent dyes and the optical brightener are intimately mixed throughout the body of the transparent plastic.

Polychromatic Effect

The polychromatic effect is observed in the following way. The sheet exhibits a main colouring which is that of the fluorescent dye, optionally mixed with a nonfluorescent dye. This main colour can be characterized using a conventional calorimetric device which makes it possible to determine the L*, a*, b* values (in particular according to Standard ASTM E 308). The three values L*, a*, b* make it possible to characterize the main colour in the system referred to as the CIELAB system. L* denotes the luminosity and extends from 0 (black) to 100 (white). a* measures the red and the green of the colour: the colours drawing towards green exhibit a negative value of a*, those drawing towards red exhibit a positive value of a*. b* measures the blue and the yellow of the colour: the colours drawing towards yellow exhibit a positive value of b*, those pulling towards blue exhibit a negative value of b*.

Figure 1:
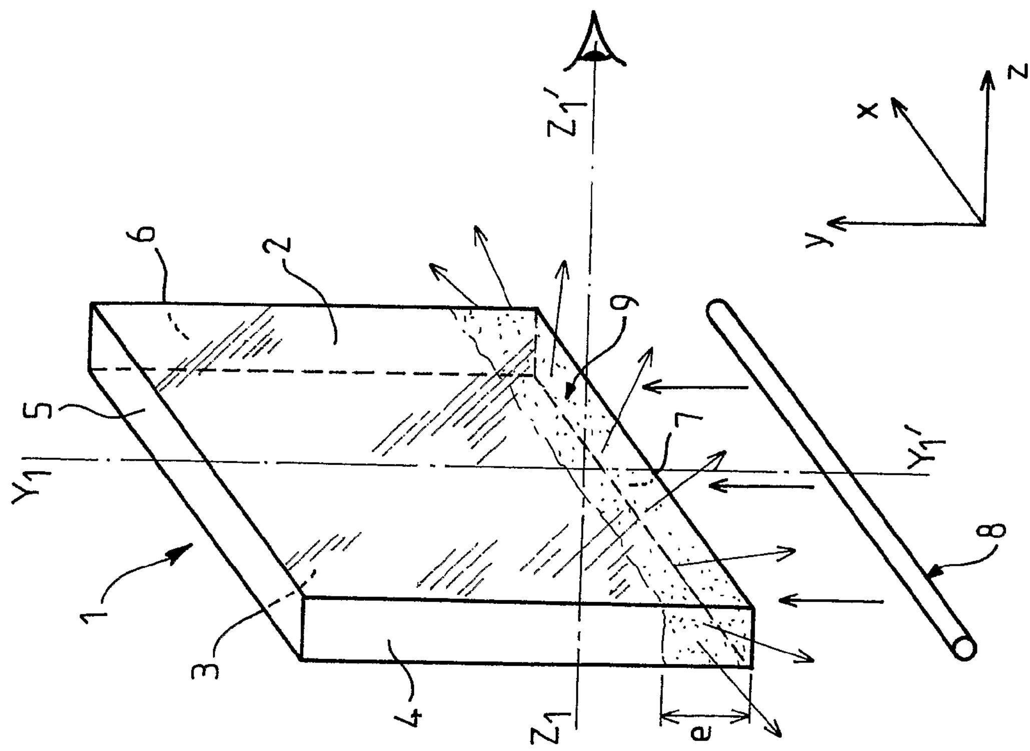
Figures 3, 4:
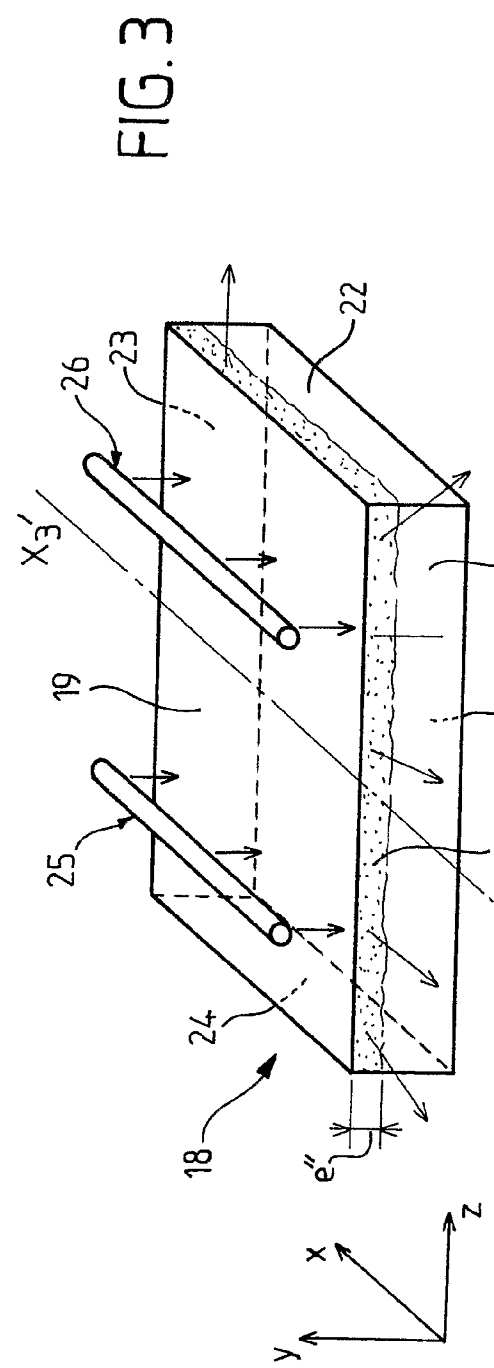

When the sheet is illuminated by a light source emitting at least a portion of its light in the region of exitation of the optical brightener positioned along one of its edges, a human observer perceives the edge illuminated in a colour different from the main colour of the sheet, as is illustrated in FIGS. 1 and 2. The colour observed along the illuminated edge has a lower b value than the main colour of the sheet. This "bluer" hue is visible along the entire length of the illuminated edge and over a thickness of the order of a few millimeters. The sheet thus exhibits, to the eyes of a human observer, a fringe with a bluer hue than the main colour of the sheet extending along the edge and over a thickness of a few millimeters, typically from 1 to 10 mm, advantageously between 1 and 8 mm, preferably between 1 and 4 mm, which clearly stands out from the remainder of the sheet. The thickness of the fringe is variable and depends in particular on the light intensity of the light source. As illustrated in FIG. 3, the sheet can also be illuminated on one of its faces. The human observer then perceives a bluer fringe which extends over a thickness of a few millimeters along the edge of the illuminated face. In the case of a moulded object, such as, for example, for the case of the twisted article illustrated in FIG. 4, the bluer fringe is visible on one of the illuminated edges.

Thus, the polychromatic effect is characterized by the appearance of a colour with a bluer hue than the main colour of the sheet along an illuminated edge, this bluer hue extends along the illuminated edge and differs from the main colour of the sheet.

The polychromatic effect results from the combination of the two ingredients of the plastic, the fluorescent dye and the optical brightener, but it is not visible when only one of the two ingredients is present.

Surface Roughness

A more or less marked surface roughness can be applied to at least one of the faces and/or to at least one of the edges, so as to obtain a translucent appearance (the term frosted is often used to denote the effect obtained). The surface roughness can be obtained in several ways. According to a 1st method, in the case of a cast sheet, the glass mould, which makes it possible to shape the sheet, itself exhibits a surface roughness which was obtained after treatment of the glass of the mould, for example with hydrofluoric acid. According to a 2nd method, sandblasting can be used, as taught in the document WO 03/083564 or U.S. Pat. No. 3,497,981. For resin-based products, surface roughness can be achieved by adding cross-linked particles. The surface roughness, recorded as Ra, is expressed in microns; it can be measured using a surface roughness measuring device (for example with the Surtronic 3P Talysurf trade mark from Rank-Taylor-Hobson) according to Standards ISO 4287 and ISO 4288. In the case where at least one of the faces and/or at least one of the edges is rendered translucent using surface roughness, the value of the surface roughness Ra is of the order of a few μm. This value is between 0.5 and 4 μm, preferably between 1 and 3 μm.

The faces and the edges of a sheet according to the invention may also be perfectly smooth and may not exhibit marked roughness. In this case, the value of the surface roughness Ra is less than 400 nm, advantageously less than 300 nm, preferably less than 100 nm.

Light Device

In order to obtain the polychromatic effect, the moulded object, in particular the sheet, is combined with at least one artificial light source which exhibits a light emission in the region of excitation of the optical brightener. This emission can be in particular in the 300-450 nm range, preferably 350-420 nm range, more preferably still 350-400 nm range. The light source can, for example, be an incandescent lamp, a fluorescent tube, a neon tube, an LED (Light Emitting Diode) or an optical fibre.

The light source can exhibit a light emission in a relatively broad range of wavelengths but it is important that a portion of the emission occurs in the region of excitation of the optical brightener. Preference will be given to an artificial light source which exhibits an emission in the 300-450 nm range, preferably 350-420 nm range, more preferably still 350-400 nm range, at a precise wavelength or in a narrow range of wavelengths of the order of 40 nm, preferably 20 nm. This thus means that the emission spectrum of the light source is very confined and entirely included in the 300-450 nm range, preferably 350-420 nm range, more preferably still 350-400 nm range. The light source can, for example, be a laser, a diode laser or an LED. In the case of an LED in particular, the emission spectrum exhibits a very confined Gaussian peak which extends over a range of wavelengths of the order of 20 nm. Mention may be made, as examples, of the LEDs sold by Ledtronics, which emit at 370, 390, 395, 400 or 405 nm. The advantage related to the use of an LED is that it is a type of light source which is increasingly used in daily life and which exhibits a low electrical energy consumption.

Illumination can also be brought about by virtue of a combination of several light sources, in particular of several LEDs, exhibiting an emission in the region of excitation of the optical brightener, in particular in the 300-450 nm range, preferably 350-420 nm range, more preferably still 350-400 nm range.

Illumination can also be brought about by the combination of at least one light source exhibiting an emission in the region of excitation of the optical brightener, in particular in the 300-450 nm range, preferably 350-420 nm range, more preferably still 350-400 nm range, and of at least one light source which emits in another range of wavelengths, between 460 and 700 nm. It is thus possible to combine, for the illumination of the moulded object, in particular of the sheet:

- a light source, preferably an LED, which exhibits an emission in the region of excitation of the optical brightener with a colour LED which emits in another range of wavelengths, that is to say between 460-700 nm. For example, the colour LED can be an LED which emits in the red between 610 and 640 nm, in particular an LED with the Osram LM03-B-A trade mark, an LED which emits in the yellow between 570 and 610 nm, in particular an LED with the Osram LM03-B-Y trade mark, and an LED which emits in the green between 500 and 540 nm, in particular an LED with the Osram LM03-B-T trade mark.
- a light source which exhibits an emission in the region of excitation of the optical brightener, preferably an LED, with a white LED, a light source which exhibits an emission in the region of excitation of the optical brightener, preferably an LED, with a fluorescent lamp.

The light source or the combination of several light sources is placed close to the part of the moulded object, in particular of the sheet, which is illuminated (for example, the edge, as in FIGS. 1 and 2, or a face, as in FIG. 3). It is situated from 0 to 100 cm, advantageously from 0 to 50 cm, preferably from 0 to 10 cm, from the illuminated part. A distance of 0 corresponds to the case where the light source is situated right against the illuminated part of the sheet. Attachment means can make it possible to fix the light source or the combination of several light sources close to or against the illuminated part of the sheet.

The polychromatic effect can also be visible with daylight alone if the latter exhibits an emission in the region of excitation of the optical brightener.

FIGURES

FIG. 1 represents a sheet 1 according to the invention positioned in an orthogonal coordinate system comprising three main axes x, y and z and illuminated via the edge. The sheet 1 has a parallelepipedal form and is delimited by two parallel faces 2 and 3 and by four edges 4, 5, 6 and 7 perpendicular to the two faces 2 and 3. It exhibits three main axes [$X_1X_1'$], [$Y_1Y_1'$] and [$Z_1Z_1'$] respectively parallel to the main axes x, y and z. A light source 8, positioned in the axis [$Y_1Y_1'$] close to and along the edge 7, illuminates the edge 7. When the sheet 1 is observed along the axis [$Z_1Z_1'$] by a human observer (represented symbolically by an eye on the axis [$Z_1Z_1'$]), the latter perceives a fringe 9 having a colour that has a bluer hue than the main colour of the sheet, visible along the illuminated edge and over a thickness e.

FIG. 2 represents a sheet 10 according to the invention in the form of a wedge positioned in the coordinate system x, y and z. The sheet 2 is delimited by two nonparallel faces 11 and 12 forming an angle θ and by four edges 13, 14, 15 and 16 perpendicular to the two faces 11 and 12. It exhibits three main axes [$X_2X_2'$], [$Y_2Y_2'$] and [$Z_2Z_2'$] respectively parallel to the main axes x, y and z. A light source 17, positioned in the axis [$Y_2Y_2'$] close to and along the edge 16, illuminates the edge 16. When the sheet 2 is observed along the axis [$Z_2Z_2'$] by a human observer, the latter perceives a fringe 18 having a colour that has a bluer hue than the main colour of the sheet, visible along the illuminated edge and over a thickness e'.

FIG. 3 represents a sheet 18 according to the invention in the form of a parallelepiped positioned in the coordinate system x, y and z and exhibiting three main axes [$X_3X_3'$], [$Y_3Y_3'$] and [$Z_3Z_3'$] respectively parallel to the main axes x, y and z. The sheet 18 is delimited by two parallel faces 19 and 20 and by four edges 21, 22, 23 and 24 perpendicular to the two faces 19 and 20. Two light sources 25 and 26, positioned above the face 19, illuminate the face 19. When the sheet 3 is observed along the axis [$X_3X_3'$] by a human observer, the latter perceives a fringe 27 having a colour that has a bluer hue than the main colour of the sheet, which extends over a thickness e" along the face 19.

FIG. 4 represents a moulded object according to the invention in the form of a twisted article 28 positioned in the coordinate system x, y and z. The twisted article exhibits an axis of rotation [$Z_4Z_4'$] around which it is wound. The twisted article 28 exhibits two edges 29 and 30. The twisted article 28 is illuminated from above using a light source 31 positioned parallel to the axis [$Z_4Z_4'$]. When the twisted article 28 is observed along the axis [$X_4X_4'$] by a human observer, the latter perceives a fringe 32 having a colour that has a bluer hue than the main colour of the sheet.

USES

The sheets and in particular the light devices according to the invention have applications in the design of shop furnishings, interior furnishings, such as wall signs or hoardings, and the like. An advantageous application consists, for example, in using a sheet illuminated by four light sources positioned against the 4 edges of the sheet as display panel. The sheet then appears in a fluorescent hue outlined by an edge of the 4 sides having a colour that has a bluer hue than the main colour of the sheet.

EXAMPLES

In each of the Examples 1 to 7, a PMMA sheet is prepared by the bulk polymerization process. The contents shown are all by weight with respect to the PMMA.

The following additives were used:

For the Fluorescent Dyes:

LISA 57Y (yellow), LISA 50B (blue), LISA 51GB (green) and LISA 61R (orange) from Bayer and LUMOGEN F Red 300 from BASF.

For the Optical Brightener:

MOLTOPREN FB, sold by ISL (Rhein Chemie), which corresponds to an optical brightener of the 1,3-diphenylpyrazoline type dispersed in the form of a very thick paste (18 000 mPa·s at 20° C.) in a polymer.

A spectrocolorimeter with the Datacolor International Specter trade mark was used to measure L*, a* and b* values in two ranges of wavelengths, 420-750 nm and 350-750 nm.

Example 1

First of all, a methyl methacrylate prepolymer is prepared by adding 20 ppm by weight of 2,2-azobisisobutyronitrile (radical initiator) to the methyl methacrylate. The mixture is heated at 90° C. until a degree of conversion of the order of 7% is obtained.

This prepolymer is cooled and then the amount (250 ppm) of the same radical initiator necessary for the polymerization of all the monomer and 2 ppm of LISA 57Y, sold by Bayer (2 ppm of the pure fluorescent dye), are added thereto. 100 ppm of conventional mould-release agent, sodium dioctyl sulphosuccinate, 0.3% of TINUVAN 770, sold by Ciba, and 500 ppm of MOLTOPREN FB (500 ppm of pure pyrazoline compound) are also added.

The mould is formed by two glass sheets with dimensions of 1000×1000×8 mm separated at their periphery by a flexible poly(vinyl chloride) (PVC) seal, the diameter of which determines the thickness of the final sheet (10 mm). The two ends of the seal are kept apart to allow the polymerizable composition to be introduced. These glass sheets are held with metal clamps.

The composition is placed under vacuum for 30 minutes in order to remove the air, then it is introduced into the mould using a funnel placed between the two ends of the PVC seal and then the mould is closed by bringing the two ends into contact.

The mould is introduced into a ventilated oven in order to polymerize the methyl methacrylate. The temperature cycle consists in heating the mould at 55° C. for 600 minutes and then at 120° C. for 2 hours in order to provide a maximum conversion of at least 99%.

A yellow-coloured sheet with a thickness of 10 mm is obtained.

Examples 2-5

The conditions of Example 1 are repeated using other dyes (see Table I).

Examples 6-7

The conditions of Example 1 are repeated but without adding optical brightener (see Table I).

The sheet of Example 2 is placed under an Osram 11 W-41-827 fluorescent lamp (power of 11 W), one of the edges of the sheet against the lamp. An intense fringe having a colour that has a bluer hue than the main colour of the sheet, with a thickness of 2 mm is perceived on the illuminated edge, which fringe extends along the entire length of the illuminated edge and is clearly distinguished from the remainder of the sheet.

The L*, a* and b* values as measured with the spectrocolorimeter are repeated in Table I. In Table I, the ppm are ppm by weight. It is noticed that, for Examples 1-5, the values of L* do not vary very much for the two ranges of wavelengths, unlike the values of b*. The latter have a tendency to strongly decrease.

were injection molded using standard acrylic processing conditions. The PMMA used is a copolymer of MMA (95.5% by weight) and ethyl acrylate (4.5% by weight) containing no additive. All of the samples contained a fluorescent dye, Solvent Yellow 191 from Lancer. This dye is dispersed by LANCER DISPERSIONS (product code: 86801) and purchased as SENECA YELLOW D991 from Day-Glo Color Corp. 4515, Saint Clair Avenue, Cleveland Ohio 44103.

Samples 8-11 also contained various levels of an optical brightener, HOSTALUX KS from Clariant (CAS N °5242-49-9). The amount of the fluorescent dye and optical brightener in each of the samples is given in Table 2.

When the plaques are exposed to UV light, an intense color having a bluer hue than the main colour is perceived along the edge of the plaque.

A Gretag Macbeth Color-eye 7000 colorimeter was used to measure the L*, a*, and b* values in reflectance, using a white background, from the 2"×3" surface of the plaques. The color values of the plaques were measured using a 10° observer and D65 illuminate including the UV (360-750 nm) and excluding the UV (400-750 nm) portion of the light spectrum. Five plaques of each sample were measured and their L*, a*, and b* values were averaged. The average values are listed in Table 2. In Table 2, the ppm are by weight.

TABLE I

| | Fluorescent dye | | Optical brightener | | L*, a*, b* measurements in the 420-750 nm range | | | L*, a*, b* measurements in the 350-750 nm range | | |
|---|---|---|---|---|---|---|---|---|---|---|
| Ex. | Type | Amount with respect to the PMMA[1] | Type | Amount with respect to the PMMA[1] | L* | a* | b* | L* | a* | b* |
| 1 | Lisa 57Y | 2 ppm | Moltopren FB | 500 ppm | 94.9 | −4.4 | 13.8 | 95.7 | −2.4 | 5.9 |
| 2 | Lisa 50B | 2 ppm | Moltopren FB | 500 ppm | 95.2 | −3 | 6 | 95.8 | −0.5 | −2.3 |
| 3 | Lisa 51GB | 2 ppm | Moltopren FB | 500 ppm | 91.9 | −11.8 | 10.8 | 92.6 | −9.8 | 3.1 |
| 4 | Lisa 61R | 2 ppm | Moltopren FB | 500 ppm | 91.9 | 7 | 10.8 | 92.7 | 9.4 | 2.7 |
| 5 | Lumogen F Red 300 | 2 ppm | Moltopren FB | 500 ppm | 92.7 | 0.1 | 4.7 | 93.4 | 2.9 | −3.6 |
| 6 (comp.) | Lisa 57Y | 2 ppm | None | | 95.7 | −16.9 | 51.4 | 94.3 | −16.1 | 50.9 |
| 7 (comp.) | Lisa 51GB | 2 ppm | None | | 91.2 | −23.2 | 45.4 | 92.6 | −9.8 | 44.9 |

[1]Amount of additive in the pure state with respect to the PMMA

Examples 8-12

A series of PMMA samples were compounded using a twin screw extruder, and then 2"×3"×⅛" plaques of each sample

TABLE 2

| | Fluorescent dye | | Optical Brightener | | L*, a*, b* measurements in the 400-750 nm range | | | L*, a*, b* measurements in the 360-750 nm range | | |
|---|---|---|---|---|---|---|---|---|---|---|
| Ex. | type | Amount with respect to the PMMA | type | Amount with respect to PMMA | L* | a* | b* | L* | a* | b* |
| 8 | Solvent Yellow 191 | 0.7 ppm | Hostalux | 240 ppm | 93.0 | −2.6 | 10.2 | 93.3 | −1.6 | 6.1 |
| 9 | Solvent Yellow 191 | 1.0 ppm | Hostalux | 160 ppm | 93.2 | −2.8 | 11.3 | 93.4 | −1.9 | 7.4 |

TABLE 2-continued

| | Fluorescent dye | | Optical Brightener | | L*, a*, b* measurements in the 400-750 nm range | | | L*, a*, b* measurements in the 360-750 nm range | | |
|---|---|---|---|---|---|---|---|---|---|---|
| Ex. | type | Amount with respect to the PMMA | type | Amount with respect to PMMA | L* | a* | b* | L* | a* | b* |
| 10 | Solvent Yellow 191 | 1.5 ppm | Hostalux | 160 ppm | 93.2 | −3.8 | 14.6 | 93.4 | −3.0 | 10.7 |
| 11 | Solvent Yellow 191 | 1.0 ppm | Hostalux | 80 ppm | 93.5 | −2.4 | 10.7 | 93.7 | −1.6 | 7.2 |
| 12 (comp) | Solvent Yellow 191 | 1.0 ppm | none | | 93.3 | −1.7 | 10.1 | 94.3 | −1.7 | 9.1 |

Example 12 demonstrates that the b* value does not decrease as much as the other formulations that contain HOSTALUX in the presence of UV light. This sample does not exhibit the same of color change that the other samples do.

The invention claimed is:

1. A resin comprising:

a) a transparent plastic exhibiting a light transmission in the visible region of at least 50%, according to Standard DIN 67-507, selected from the group consisting of polystyrene, poly(ethylene terephthalate), a transparent polyolefin, poly methyl methacrylate (PMMA), a transparent polyamide or polycarbonate;

b) from 0.1 to 10 ppm, with respect to the transparent plastic (ppm: by weight) of at least one fluorescent dye which absorbs light energy in the visible light region and reemits light energy in the visible light region; and c) from 50 to 10 000 ppm, (ppm by weight) with respect to the transparent plastic of at least one optical brightener, which absorbs light energy in the 300-430 nm range and reemits light energy in the 400-500 nm range, wherein the fluorescent dye is selected from the group consisting of:

perylenes of formula (I):

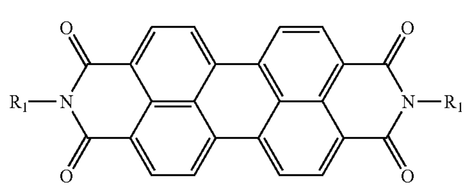

(I)

in which $R_1$ denotes:

an alkyl group having from 1 to 20 carbon atoms, a cycloalkyl group having from 3 to 20 carbon atoms, an alkyl group having from 1 to 20 carbon atoms which is substituted by one or more groups of —OH, $—OR_2$, $—C(=O)—OR_2$, $—C(=O)—NR_2R_3$, $—NR_2—C(=O)R_3$, phenyl or substituted phenyl type with $R_2$ and $R_3$ denoting —H or an alkyl group having from 1 to 20 carbon atoms, coumarins;

xanthenes;

thioxanthenes;

azlactones;

methines; and oxazines and thiazines;

and wherein the optical brightener is selected from the group consisting of:

distyrylbenzenes;

distyrylbiphenyls;

coumarins;

triazinylaminostilbenes;

bis(benzoxazoles);

benzimidazoles; and pyrazolines.

2. A resin according to claim 1, wherein the transparent plastic is a homopolymer of methyl methacrylate or a copolymer comprising from 60 to 100% by weight of methyl methacrylate and from 0 to 40% by weight of at least one monomer having at least one ethylenic unsaturation which can copolymerize with the methyl methacrylate.

3. A resin according to claim 1, wherein the transparent plastic is a polyester of carbonic acid, that is to say a polymer obtained by the reaction of at least one carbonic acid derivative with at least one aromatic or aliphatic diol.

4. A resin according to claim 1, wherein the transparent plastic further comprises one or more nonfluorescent dye(s).

5. A resin according to claim 1, wherein the concentration of the nonfluorescent dye(s) in the transparent plastic is between 0 and 3000 ppm, with respect to the transparent plastic.

6. A resin according to claim 1, wherein the transparent plastic comprises inorganic or organic particles, the size of which is between 0.1 and 1000 μm, which exhibit a difference in refractive index, with respect to the transparent plastic, of ±0.003 to 0.2.

7. A resin according to claim 1, wherein the transparent plastic comprises polymer particles, the size of which is between 0.05-0.4 μm, which are refractive index matched with respect to the transparent plastic.

8. A resin according to claim 1 comprising a moulded object having a polychromi effect.

9. The resin according to claim 8 wherein said moulded object is in the form of a sheet.

10. The resin according to claim 8 wherein said moulded object is in the form of a monolayer sheet.

11. Light device comprising a moulded object according to claim 8 and at least one artificial light source which exhibits a light emission in the region of excitation of the optical brightener.

12. Light device according to claim 11, wherein the artificial light source exhibits an emission in the 300-450 nm range.

13. Light device according to claim 11 wherein the artificial light source is an incandescent lamp, a fluorescent tube, a neon tube, an LED (Light Emitting Diode) or an optical fibre.

14. Light device according to claim 11, wherein the artificial light source is combined with at least one other light source which emits between 460 and 700 nm.

15. Light device according to claim 14, wherein the other light source is a colour LED.

16. Light device according to claim 14, wherein the other light source is a white LED.

17. Light device according to claim 14, wherein the other light source is a fluorescent lamp.

18. Light device according to claim 11, wherein the light source or the combination of light sources is placed close to the part of the moulded object, in particular of the sheet, which is illuminated.

19. The resin according to claim 1 comprising:

a) a transparent plastic exhibiting a light transmission in the visible region of at least 80 percent, according to Standard DIN 67-507;

b) from 2 to 10 ppm, with respect to the transparent plastic (ppm: by weight) of at least one fluorescent dye; and c) from 200 to 800 ppm, (ppm by weight) with respect to the transparent plastic of at least one optical brightener.

20. A resin according to claim 1, wherein the concentration of the nonfluorescent dye(s) in the transparent plastic is between 0 and 3000 ppm, with respect to the transparent plastic.

21. A resin according to claim 5, wherein the concentration of the nonfluorescent dye(s) in the transparent plastic is between 0 and 700 ppm, with respect to the transparent plastic.

22. A resin according to claim 6, wherein the transparent plastic comprises inorganic or organic particles, the size of which is between 1 and 5 μm.

23. Light device according to claim 11, wherein the artificial light source exhibits an emission in the 350-400 nm range.

* * * * *